United States Patent [19]

Gunton et al.

[11] Patent Number: 4,967,199

[45] Date of Patent: Oct. 30, 1990

[54] GROUND PROBING RADAR METHOD AND APPARATUS

[75] Inventors: David J. Gunton, Stakeford; Howard F. Scott, Whitley Bay; Michael P. Stansfield, Old Benwell; Paul B. Cordes, Whitley Bay; Roger P. Ashworth, Forest Hall, all of England

[73] Assignee: British Gas plc, London, England

[21] Appl. No.: 357,532

[22] Filed: May 26, 1989

[30] Foreign Application Priority Data

May 27, 1988 [GB] United Kingdom ............... 8812705
Apr. 10, 1989 [GB] United Kingdom ............... 8908022

[51] Int. Cl.$^5$ ............................................. G01S 13/04
[52] U.S. Cl. ...................................... 342/22; 342/158
[58] Field of Search .................................. 342/22, 158

[56] References Cited

U.S. PATENT DOCUMENTS

| | | | |
|---|---|---|---|
| 4,118,703 | 10/1978 | Williams | 342/158 |
| 4,698,634 | 10/1987 | Alongi et al. | 342/22 |
| 4,728,897 | 3/1988 | Gunton | 324/329 |

FOREIGN PATENT DOCUMENTS

| | | |
|---|---|---|
| 0178877 | 4/1986 | European Pat. Off. |
| 0179601 | 4/1986 | European Pat. Off. |
| 57-29982 | 2/1982 | Japan |
| 57-29983 | 2/1982 | Japan |
| 60-263880 | 12/1985 | Japan |
| 2165701A | 4/1986 | United Kingdom |
| 2188506A | 4/1987 | United Kingdom |

OTHER PUBLICATIONS

H. F. Scott et al; "Radar Detection of Buried Pipes and Cables" Nov. 24 & 25, 1987.

Primary Examiner—Gilberto Barron, Jr.
Attorney, Agent, or Firm—Larson and Taylor

[57] ABSTRACT

A wheeled support assembly 10 is manually pushed over the ground and has a motor 22 rotating an antenna assembly 60 about a vertical axis 24. Encoders 28 on the antenna shaft 20 and on a wheel axle encode antenna angular position and position over the ground. Transmitted pulses and received data pass through a rotary microwave connector 26. For example, 400 sets of pulses are emitted at equal angular intervals in each revolution of the antenna assembly. The interval between pulses is e.g. 12 microseconds, with 256 pulses per set. Noise reduction is achieved by processing the received data accordingly. In a modification the rotary connector 26 is single channel with some electronic stages mounted on the rotating antenna assembly. Power is coupled to them via the microwave cable. An umbilical connects the assembly 10 to a support facility including a computer. Alternatively, battery power is used with data transferred radiatively.

6 Claims, 8 Drawing Sheets

GROUND PROBING RADAR METHOD AND APPARATUS

The invention relates to ground probing radar methods and apparatus, particularly though not exclusively for use in locating buried pipes.

Such methods and apparatus are described for example in United Kingdom patent applications Nos. 8525389 Ser. No. 2165701A; 8525390 Ser. No. 2165702A; & 8706252 Ser. No. 2188506A.

A ground probing radar method according to the invention comprises moving an antenna assembly over the ground while the assembly is rotating about an axis directed into the ground and is transmitting and receiving electromagnetic radiation, producing data in response to rotation of the antenna assembly about said axis and using said data to control successive energisations of the antenna assembly.

Ground probing radar apparatus according to the invention comprises a support assembly which can be moved over the ground, an antenna assembly mounted on the support assembly so as to be rotatable about an axis directed into the ground, a drive motor mounted on the support assembly and connected to the antenna assembly so as to be able to rotate it about said axis, and means operable in response to rotation of the antenna assembly about said axis to produce data representative of the angular position of the antenna assembly about said axis.

Preferably, the support assembly comprises wheels on which the assembly runs over the ground.

Preferably said data is used to initiate the energisation of the antenna assembly to emit radiation therefrom.

Forms of the method and embodiments of apparatus for performing the method will now be described by way of example with reference to the accompanying drawings in which.

Figure 1:
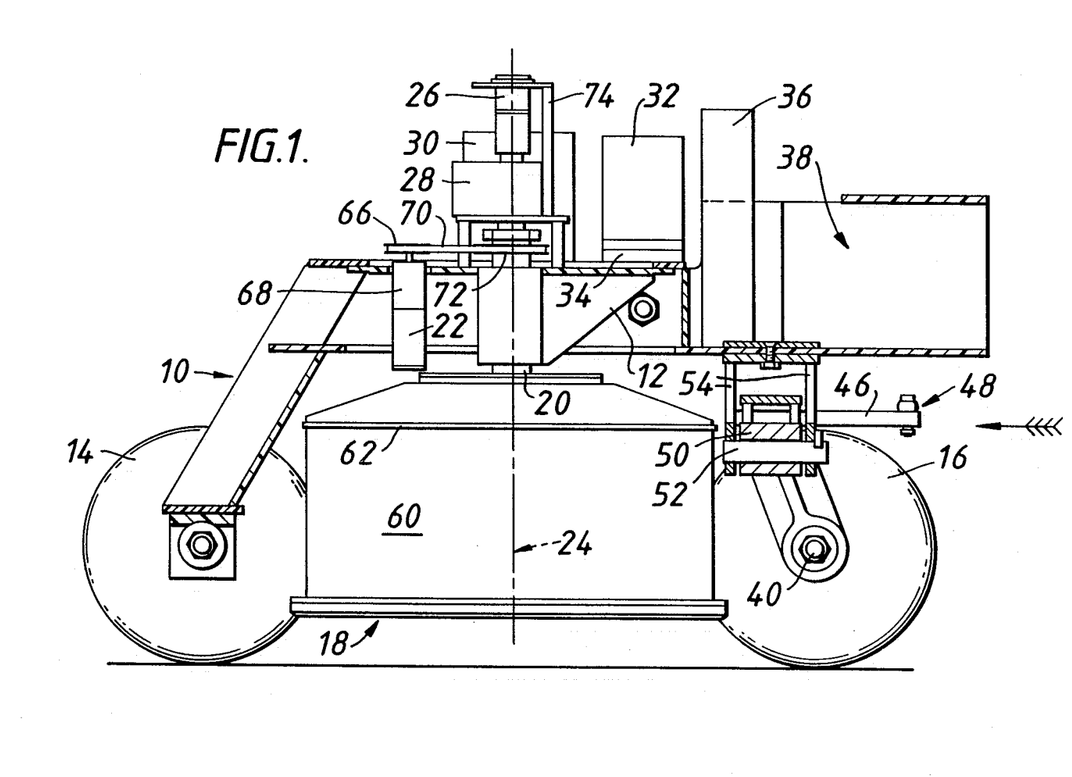
FIG. 1 is a side-elevation of a support assembly carrying an antenna assembly.
Figure 2:
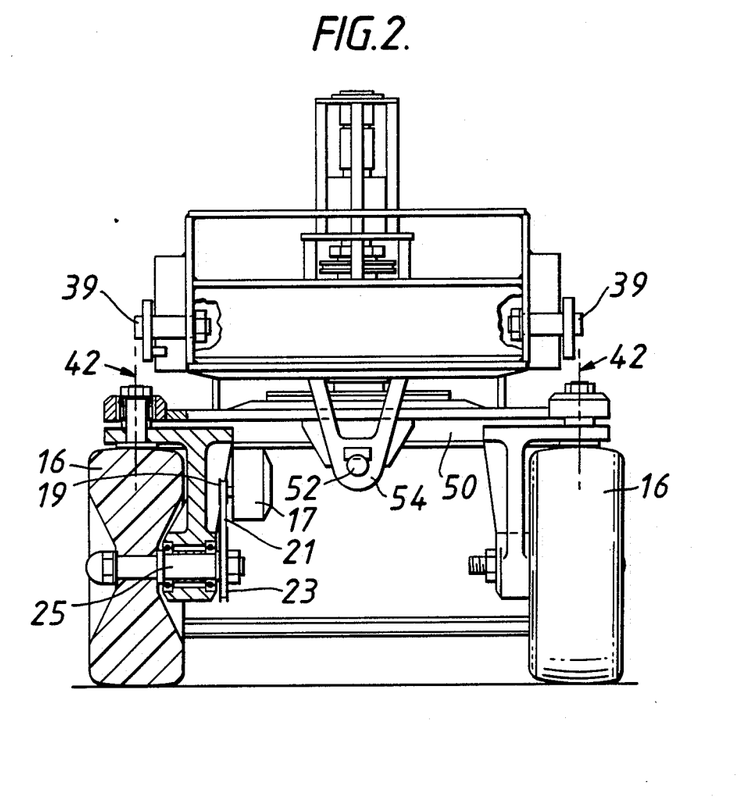
FIG. 2 is an end elevation of the support assembly seen in the direction of the arrow in FIG. 1.

FIGS. 1 & 2 show the following main items: a support assembly 10 comprising a chassis 12 mounted on four ground wheels, the leading pair 14 being on fixed axles and the trailing pair 16 being mounted for castor action; an encoder 17 (FIG. 2) driven by rotation of one of the rear wheels 16; an antenna assembly 18 carried on a vertical, hollow shaft 20 beneath the chassis 12; an electric drive motor 22 for rotating the antenna assembly 18 about a vertical axis 24; a two-channel microwave rotating connector assembly 26 at the upper end of the shaft 20; and an encoder 28 driven by rotation of the shaft 20.

FIG. 1 also shows the following parts of the electronics carried by the support assembly though they are omitted from FIG. 2: an impulse generator and control unit 30; a sampling unit 32; a delay line assembly 34; power supplies, regulators and analogue-to-digital convertor at 36; and a digital signal processor 38.

The support assembly is intended to be pushed by an operative holding a handle (not shown) attached at pivot connections 39 at each side of the assembly, with the wheels 14 leading. In order to change or correct the course of the assembly the operative pushes the handle sideways so that the assembly turns to one side or the other. This action is facilitated by the castor action of the rear wheels 16. The rotational axis 40 of each wheel 16 is offset rearwardly from the corresponding vertical axis 42 about which the trunnion 44 of the wheel can turn. The trunnions 44 have integral arms 46 each pivotally connected at 48 to a transverse tie-bar (not shown) so that the wheels 16 turn in synchronism about their vertical pivot axes 42.

The trunnions 44 are pivotally connected about the axes 42 to a common cross-piece 50, which can rock about a horizontal pin 52 connecting the cross-piece 50 to a bracket 54 secured to the chassis 12. The support assembly 10 accordingly is effectively supported at three points i.e. the two front wheels 14 and the midpoint of the cross-piece 50.

The encoder 17 is driven by a pulley 19 around which passes an endless belt 21. The belt also passes around a pulley 23 secured to a shaft 25 on which one of the rear wheels 16 is mounted.

The chassis 12 is constructed of synthetic plastics material so far as possible particularly above the top of the antenna assembly or close to the antenna assembly.

The antenna assembly comprises two interleaved mutually orthogonal logarithmic spirals formed as etched copper layers on an insulative support sheet. Typically, when energised such transmit elements emit circularly polarised electromagnetic radiation. The copper layers are on the underside of the sheet which extends horizontally across the inside of a cylindrical drum 60 of synthetic plastics material. The board is near the lower edge of the drum 60.

Figure 2A:
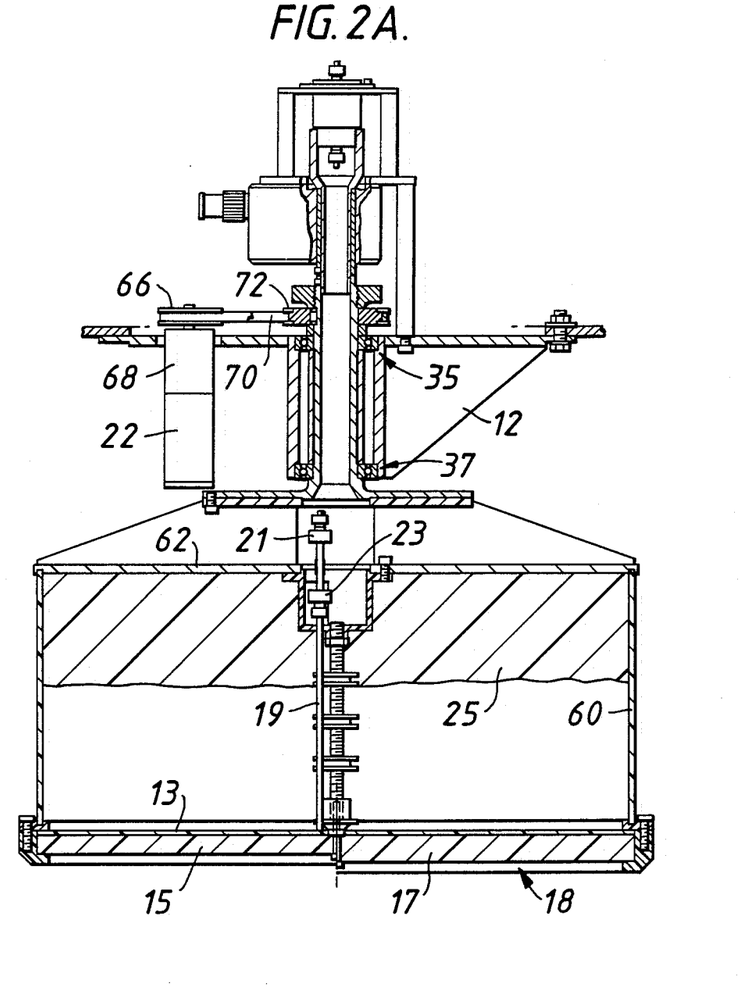
FIG. 2A is a vertical section through the antenna assembly shown in FIG. 1.

FIG. 2A shows the support sheet 13 which is shown with cladding 15 of dielectric material extending across the underside of the sheet immediately against the antenna elements, which are so thin that they are not visible in section. The right-hand side of the FIG. 2A shows a thicker slab of cladding 17 which may be preferred.

The emitter elements are energised via a microwave conductor 19 including baluns 21, 23. A similar conductor (not shown) energises the receive elements.

The absorber material is indicated at 25 in the upper part of the drum 60. The cladding 15 or 17 may be dispensed with for some applications.

Figure 2B:
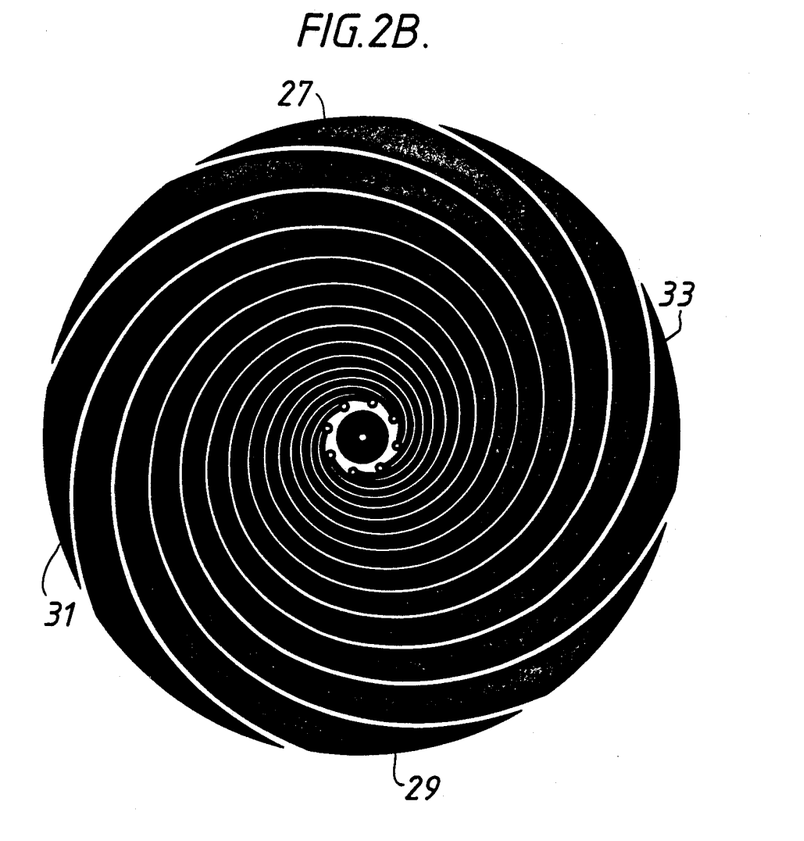
FIG. 2B is a view from below of the antenna elements of the antenna assembly shown in FIG. 1 with the dielectric cladding removed.

FIG. 2B shows the antenna elements. Although eight spiral arms are present, only four are used in this embodiment, namely transmit elements 27 and 29 and receive elements 31 and 33. The remaining four intermediate elements are not used and are terminated by load resistors (not shown).

FIG. 2A also shows the bearings at 35, 37 by which the antenna assembly 18 is rotatably supported.

Above the board there is a body of dielectric material which absorbs electromagnetic radiation. Above the absorber at the level 62, there is a horizontal metal wall to act as a reflector of unwanted radiation. The reflected radiation is out of phase with the radiation emitted downwardly by the elements formed by the arms of the spiral on the board and so does not diminish the emitted signal.

The shaft 20 is supported by two bearings and the motor 22 drives a pulley 66 via a gearbox 68, the pulley being connected by a belt 70 to a pulley 72 on the shaft 20.

The transmit and receive elements of the antenna formed by the arms of the interleaved spirals are connected via baluns within the drum 60 by two leads which pass upwardly through the shaft 20. The leads are connected to two corresponding parts of the microwave connector assembly 26, which parts rotate with the antenna assembly 18. Those parts transfer the signals from and to two corresponding fixed parts of the connector assembly 26 which are supported by a fixed bracket assembly 74 secured to the chassis 12.

Figure 3:
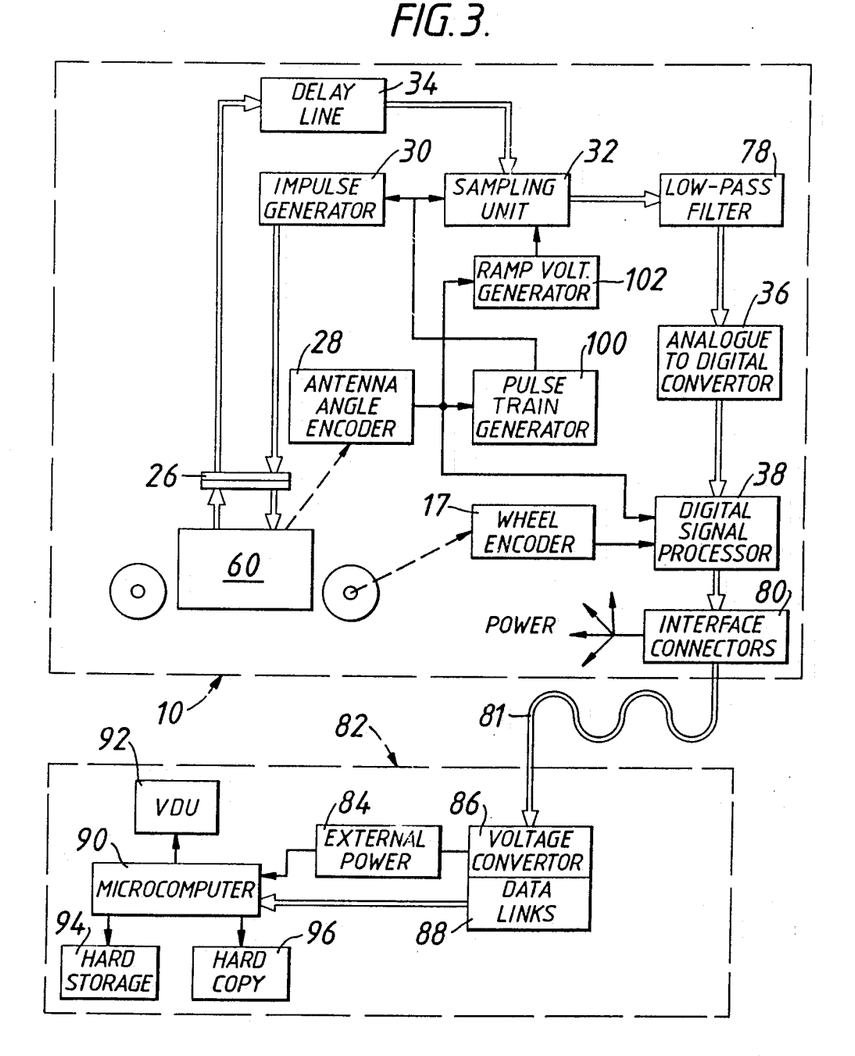
FIG. 3 is a block diagram showing the principal components of a complete ground probing radar system to show which components are carried on the support assembly.
Figure 4:
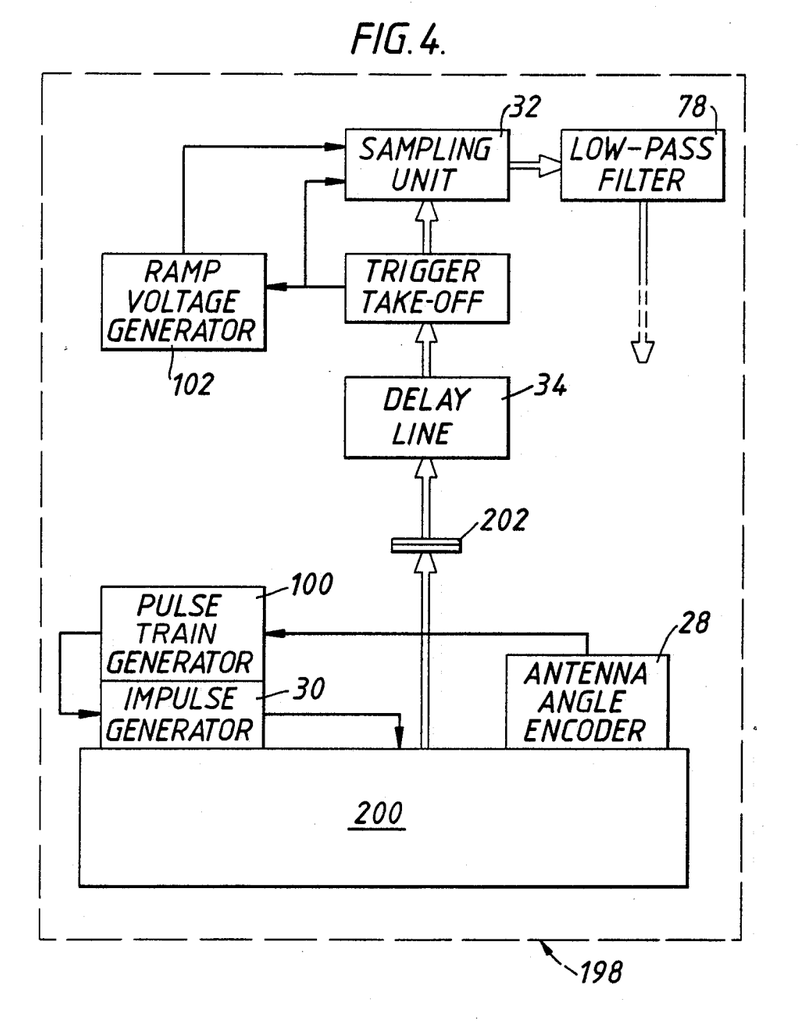
FIG. 4 is block diagram showing the principal components on a support assembly in a modified system.

In FIGS. 3 & 4, the paths followed by transmitted pulses and the received data from the receive elements of the antenna assembly 60 are indicated by double lines. The single lines represent control signal paths.

The two fixed parts of the connector assembly 26 are connected to respective input and output terminals. The input terminal is connected via microwave cable to the impulse generator 30 (FIG. 3) and the output terminal is connected via microwave cable to the delay line 34 (FIG. 3) and thence to the sampling unit 32. From the sampling unit 32 the received signal passes to a low-pass filter 78 and thence to the analogue-to-digital stage at 36, followed by the digital signal processor 38.

From the signal processor 38 the signal passes via interface connectors 80 to an umbilical cable 81 which trails from the support assembly 10.

The umbilical extends to a support facility 82 which typically is carried on a vehicle such as an automobile truck or van and which includes a power supply 84 from which power is passed through the umbilical to the electronic circuitry on the support assembly 10 via the interface connectors 80.

The support facility 82 also comprises a voltage convertor 86, data links 88, a micro-computer 90, a visual display unit 92, hard-storage facility 94 and hard copy production facility 96.

The wheel encoder 17 produces pulses representative of travel of the support assembly 10 over the ground and that first data passes to the digital signal processor 38.

The antenna assembly shaft encoder 28 produces pulses which are also fed to the digital signal processor 38.

The support assembly also carries a pulse train generator 100 and a ramp voltage generator 102. The first data pulses from the shaft encoder 28 are fed to both of the generators 100 and 102, and the output from generator 100 is fed to the impulse generator 32. The output from the ramp voltage generator 102 is also fed to the sampling unit 32.

OPERATION

The support assembly 10 is wheeled over the ground by an operative. Typically, the assembly 10 is made to follow successive straight courses parallel to each other and spaced apart some 10 centimeters. As the assembly 10 travels along a course the wheel encoder 17 continuously produces first data pulses. The antenna assembly 18 is rotated continuously by the motor 22 and the shaft encoder 28 produces a second data pulse at each successive angular internal. For example, the antenna assembly 18 rotates at 40 revolutions per minute and the encoder 28 produces 1600 pulses per revolution of the antenna assembly 18. For example, every fourth pulse is used by the pulse train generator 100 to initiate a train of 256 microwave pulses which, after suitable conversion by the impulse generator 30 are transmitted from the transmit elements of the antenna assembly 18. The time between the transmitted pulses is 12 micro-seconds.

The rate of rotation of the antenna assembly 18, and the number and repetition frequency of the transmitted pulses in each set are chosen so that the transmission of each set is completed before the initiation of the succeeding set. The running time of the voltage ramp produced by the generator 102 is the same as the duration of each set of pulses.

The rate of rotation of the antenna assembly 18 and the duration and frequency of the pulse sets are also chosen to suit an acceptable rate of travel of the support assembly over the ground and to ensure that the successive sets of pulses are transmitted at suitable intervals along the course for example at intervals of 10 centimeters if the support assembly travels at a linear rate of 8 meters per minute.

After emission from the antenna transmit elements, the pulses are scattered by the ground and objects buried in the ground. A small proportion of reflected electromagnetic energy strikes the antenna receive elements and produces received data which passes from the antenna to the sampling unit 32. The sampling unit 32 outputs a set of analogue voltage levels equal in number to the number of pulses in each set of transmitted pulses. After passing through the low-pass filter 78 to the analogue-to-digital convertor 36, a set of digitised voltage levels results. They are passed via the umbilical 81 to the microcomputer 90. The control signals for the various processes in the system are handled by the microprocessor of the computer 90.

In particular, two waveforms $I_n$, $Q_n$ are derived from the digitised voltage levels obtained according to the expressions:

$$In = \sum_{1}^{R}\left(\sin r\frac{360}{R}\right)a_{n,r}$$

$$Qn = \sum_{1}^{R}\left(\cos r\frac{360}{R}\right)a_{n,r}$$

for $N = 1.2 \ldots N$

Where: N is the number of pulses in each set; 2R is the number of equi-spaced angular intervals in one revolution of the antenna assembly at each of which intervals a new set of pulses is initiated; $a_{n,r}$ is the nth digitised voltage level in the waveform initiated at an angle $r = 360/2R$ relative to some fixed arbitrary reference direction normal to the axis of rotation 24 of the antenna assembly 18.

$I_n$ and $Q_n$ are the nth values of the waveforms I and Q each of which has N values.

In the sample of the method and apparatus described above, $N = 256$ and $R = 200$. Assuming the voltages $a_{n,r}$ are subject to noise, the process just described reduces the noise by a factor of $N/2$ approximately.

The waveforms I, Q are combined with corresponding reference waveforms derived from data received when a reference object is irradiated with output from the antenna assembly. The combination is such that indications can be derived of the orientation and depth of buried objects such as pipes and cables. Further information about such combination is contained in our co-pending United Kingdom patent application No. 8706252 Ser. No. 2188506A.

The first data i.e. the output pulses from the wheel encoder 17 are used as a convenient way of providing a location in terms of distance travelled from a start point on a particular survey line.

In a first mode of using the support assembly, the speed at which the operator moves the assembly over the ground determines the distance travelled between successive sets of pulses emitted from the antenna. In this case, the times between such sets remains constant throughout.

In another mode of using the support assembly which is particularly suitable where the survey is required to be made on the basis of a grid at each node of which the antenna is to emit a set of pulses, the distance travelled between successive sets remains constant. In this mode, the data produced by the wheel encoder 17 is used with a clock output to derive the rate of travel of the assembly. The rate is used with the second data from the antenna encoder 28 to ensure that the centre points of successive increments of travel (over which the successive sets of pulses are emitted) are separated by equal distances.

MODIFICATIONS

For some applications, it may be preferable to provide the antenna elements with dielectric cladding positioned between the elements and the ground as described in our co-pending United Kingdom Patent Application No. 8706252 Ser. No. 2188506A.

Instead of using mains power supplies, power for the components on the support assembly 10 can be provided by batteries. Data can be transmitted from the assembly by radiation e.g. light, infra-red, radio so as to eliminate the need for an umbilical connection between the assembly 10 and the support facility 82.

As another alternative, using battery power on the support assembly 10, data can be stored on the assembly 10 instead of being transmitted in real time. Data could be down-loaded periodically by bringing the assembly 10 to the support facility 82 and engaging physical data links e.g. plug and socket connectors.

FIG. 4 shows another modification in which, in a modified support assembly 198, the impulse generator 30 is mounted on a modified antenna assembly 200. The pulse train generator 100 is also mounted on the antenna assembly 200. The rotating microwave connector 202 provides only a single channel i.e. for received data. The encoder 28 is reversed so that its output port rotates with the antenna assembly 200.

In the modified construction shown in FIG. 4, the sampling unit 32 is triggered by the received signal. In order to ensure that such triggering is effective, a relatively large trigger pulse must be added onto the front of each received data pulse train. This is achieved by using the trigger take-off as shown in FIG. 4.

The supply of power to the circuitry on the rotating antenna assembly 200 can be provided by means of a radiative-transfer coupling arrangement (not shown) which couples power into the microwave cable which connects the receive antenna elements to the single-channel connector 202. Such power transfer does not interfere with the received data conveyed by the core conductor of such a cable.

FIG. 4 can be powered from batteries on board the support assembly or from mains via an umbilical.

In another modification (not shown) the trigger pulse mentioned above is derived from motion of the antenna assembly using a light source such as a light-emitting diode and light sensors which source and sensors are moved relatively by the rotation of the antenna assembly.

The encoder 17 is only one example of how data representative of the position of the support assembly can be derived for recording in the support facility 82. It is not essential to use an encoder or other device to respond to wheel rotation. Instead for example the support assembly can be mounted on a boom which is rotatably mounted or otherwise movable mounted e.g. on the vehicle which carries the support facility 82. In such a case, movement of the boom can be used to drive an encoder in response to the rotation of the boom about a known axis and also, if required, extension of the boom by telescopic action say can be used to drive a second encoder in response to change in boom length.

Figure 5:
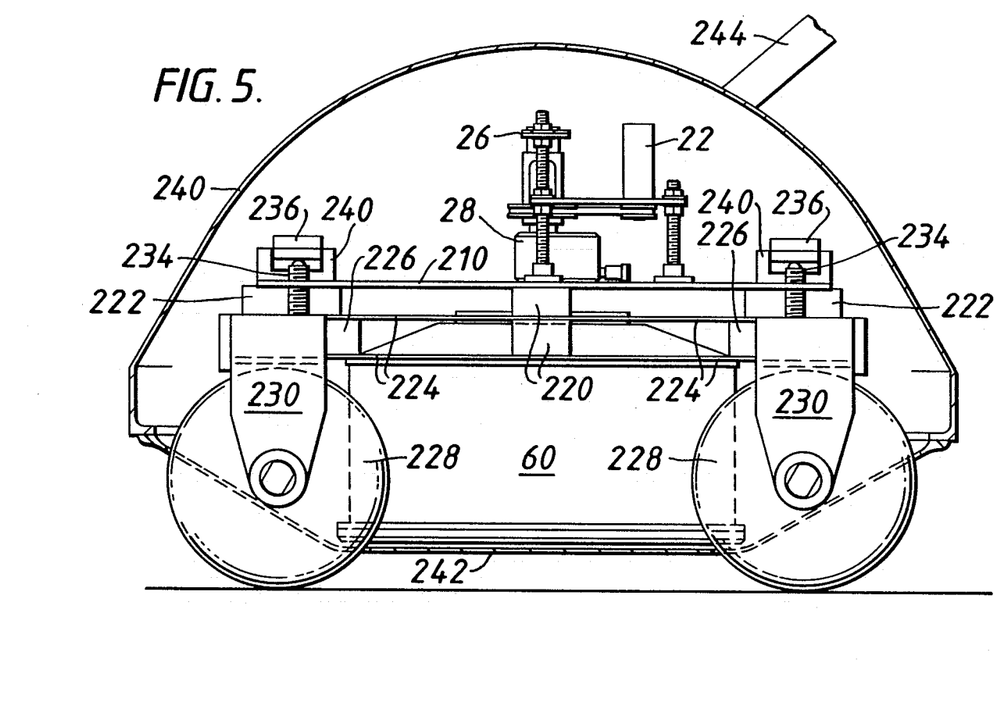
FIGS. 5 and 6 are side and end elevations, partly in section, of a modified form of support assembly.
Figure 6:
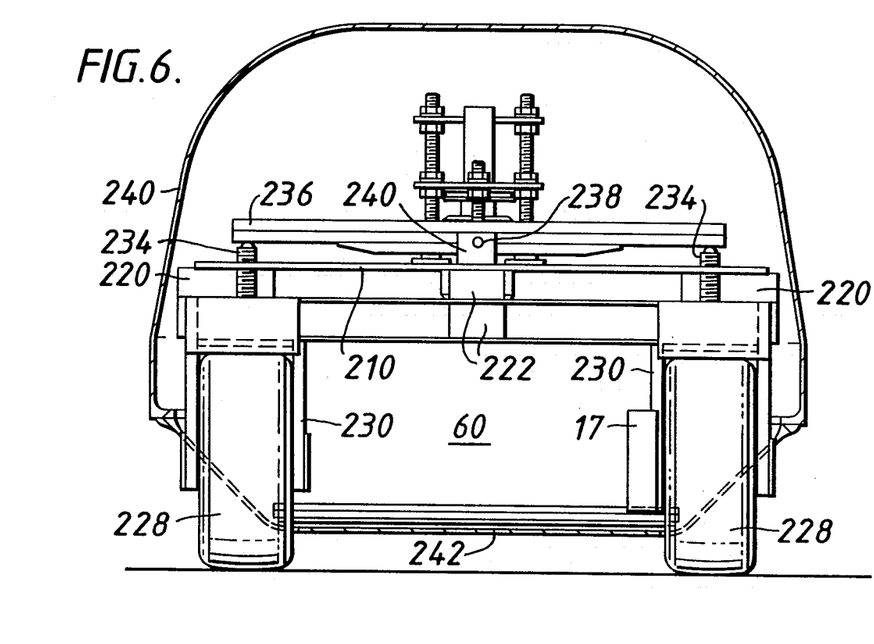

In a modification shown in FIGS. 5 and 6 a square plate 210 of aluminium alloy measures, for example, 60×60 centimeters, is placed above the antenna drum 60. If the plate is made thick enough to form the chassis of the support assembly. Virtually all the structure below the chassis 210 is made of plastics material. This plate 210 produces a large amount of RF shielding of the metalwork of the electronic units mounted on the upper side of the plate 210.

The plate 210 is square in order to provide 4-fold symmetry of shielding.

The electronic boxes (not shown) are mounted on the plate 210 and do not overhang the edge. If the box height exceeds a few centimeters, for example 7.5 centimeters, a square annulus of microwave absorber must be placed arount them. The encoder beneath the chassis 210 operates by detecting a light beam interrupted by a toothed wheel rotating with a wheel. Optical fibres are used to feed light to the toothed wheel and to conduct signals encoding the rotation.

The wheels cannot exactly provide 4-fold symmetry and are placed at experimentally determined positions to reduct their influence to a minimum.

In this modification the speed of survey has been increased to one meter per second. This requires an increase in antenna speed to 300 revolutions per minute (60×½×10) i.e. ten data collection points/meter×½ revolution per data point.

The square plate 210 is shown supported on two plastics side blocks 220 and two plastics end blocks 222. The side blocks 220 each support like ends of two pairs of oppositely extending plastics leaf springs 224. The opposite ends of the leaf springs 224 are jointed by a plastics block 226. Each block 226 supports a wheel 228 on a trunnion 230.

Each end block 222 supports the like ends of two pairs of oppositely extending plastics leaf springs 232. The opposite ends of these springs are jointed by one of the blocks 226.

A plastics screwed rod 234 extends upwardly from each block 226 and through a hole in the plate 210. The rods 234 of each pair at the ends of the support assembly engage the underside of a plastics pivot arm assembly 236 which is pivotted upon a pivot pin 238 on a plastics block 240 mounted on the plate 210 above the blocks 222.

One of the assemblies 236 is preferably prevented from turning on its pivot pin 238. Each wheel is thus mounted on two pairs of leaf springs, the side springs 224 and the end springs 232 which mainly ensure that the wheel is kinematically located with respect to the chassis and can move vertically. The assemblies 236 provide the principal spring stiffness and by having one assembly 236 non-pivotting on its pin 238 a three-point suspension is achieved.

The spring assemblies 236 can be replaced by pneumatic spring assemblies in a modified arrangement. Instead of leaf springs 224, 232, plastic links pin-jointed at their ends can be used for the suspension.

The support assembly includes a plastics overcover 240 and a plastics undercover 242. The wheels 228 are made of plastics material and as far as possible the whole of the construction beneath the metal plate 210 presents 4-fold symmetry to the antenna.

A plastics handle 244 is provided which can be swung over the assembly to either position, so that the assembly can be driven in either direction.

Clearly, many variations are possible but the aim is, in this embodiment, to provide 4-fold symmetry as far as possible.

We claim:

1. Ground probing radar apparatus comprising a support assembly which can be moved over the ground, an antenna assembly comprising transmit and receive elements and mounted on the support assembly so as to be rotatable about an axis directed into the ground, a drive motor mounted on the support assembly and connected to the antenna assembly so as to be able to rotate it about said axis, and means operable in response to rotation of the antenna assembly about said axis to produce data representative of the angular position of the antenna assembly about said axis, the support assembly carrying an impulse generator feeding pulses to the transmit elements of the antenna assembly, a sampling unit, a low-pass filter for receiving the output from the sampling unit, an analogue-to-digital converter for receiving the output from the filter, a digital signal processor receiving the output from the converter, a ramp voltage generator and a pulse train generator, said data being fed to the digital signal processor and to the ramp voltage generator, the output from the pulse train generator being fed to the impulse generator and to the sampling unit, and the sampling unit receiving the output data from the receive elements of the antenna assembly via a delay line and the output from the ramp voltage generator being fed to the sampling unit.

2. Ground probing radar apparatus comprising a support assembly which can be moved over the ground, an antenna assembly comprising transmit and receive elements and mounted on the support assembly so as to be rotatable about an axis directed into the ground, a drive motor mounted on the support assembly and connected to the antenna assembly so as to be able to rotate it about said axis, and means operable in response to rotation of the antenna assembly about said axis to produce data representative of the angular position of the antenna assembly about said axis, the support assembly carrying an impulse generator feeding pulses to the transmit elements of the antenna assembly, a sampling unit, a low-pass filter for receiving the output from the sampling unit, an analogue-to-digital converter for receiving the output from the filter, a digital signal processor receiving the output from the converter, a ramp voltage generator and a pulse train generator, said data being fed to the digital signal processor and to the ramp voltage generator, the output from the pulse train generator being fed to the impulse generator and the sampling unit receiving the output data from the receive elements of the antenna assembly via a delay line and the output from the ramp voltage generator being fed to the sampling unit.

3. Ground probing radar apparatus comprising a support assembly which can be moved over the ground, an antenna assembly comprising transmit and receive elements and mounted on the support assembly so as to be rotatable about an axis directed into the ground, a drive motor mounted on the support assembly and connected to the antenna assembly so as to be able to rotate it about said axis, and means operable in response to rotation of the antenna assembly about said axis to produce data representative of the angular position of the antenna assembly about said axis, the support assembly carrying a sampling unit, a low-pass filter for receiving the output from the sampling unit, an analogue-to-digital converter for receiving the output from the filter, a digital signal processor receiving the output from the converter, and a ramp voltage generator, said antenna assembly carrying a pulse train generator and impulse generator the output from the pulse train generator being fed directly to the impulse generator of the antenna assembly and the sampling unit receiving the output data from the receive elements of the antenna assembly via a delay line and a trigger take-off, a trigger pulse output from said trigger take-off being fed to the sampling unit and to the ramp voltage generator, the output from said ramp voltage generator being also fed to the sampling unit.

4. Apparatus according to claim 1 the support assembly being supported on ground-engaging wheels.

5. Apparatus according to claim 1 said means being an encoder operable in response to rotation of the antenna assembly.

6. Apparatus according to claim 1, the antenna assembly comprising a cylindrical drum supported at the lower end of a hollow support shaft, said antenna elements being carried on a support sheet extending across the drum, the shaft extending to a rotary microwave connector, a microwave conductor extending through the hollow shaft at least from said receive elements of the antenna assembly to a microwave rotary connector connected to the shaft, a drive motor and drive means coupling the motor to the shaft.

* * * * *